United States Patent
Crane et al.

(10) Patent No.: US 6,549,375 B1
(45) Date of Patent: Apr. 15, 2003

(54) SUSPENSION GIMBAL WITH REDUCED PITCH STIFFNESS, COMPLIANT PRELOADING BRIDGE AND UNLOADING LIMITERS

(75) Inventors: Peter Crane, Richfield, MN (US); Markus Erwin Mangold, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/493,303

(22) Filed: Jan. 28, 2000

Related U.S. Application Data

(60) Provisional application No. 60/117,791, filed on Jan. 29, 1999.

(51) Int. Cl.$^7$ .............................. G11B 5/54; G11B 5/596
(52) U.S. Cl. ................................ 360/245.3; 360/245.9; 360/294.3
(58) Field of Search ........................ 360/294.1, 294.3, 360/294.4, 294.5, 294.6, 78.05, 264.5, 245.3, 245.7, 245.9, 254.7, 254.8, 254.9, 255

(56) References Cited

U.S. PATENT DOCUMENTS

| | | | | |
|---|---|---|---|---|
| 5,115,363 A | * | 5/1992 | Khan et al. ............... | 360/245.3 |
| 5,189,575 A | * | 2/1993 | Onooka et al. ............. | 360/128 |
| 5,208,712 A | * | 5/1993 | Hatch et al. .............. | 360/254.8 |
| 5,237,472 A | * | 8/1993 | Morehouse et al. ...... | 360/254.8 |
| 5,657,188 A | * | 8/1997 | Jurgenson et al. ........ | 360/294.3 |
| 5,745,319 A | * | 4/1998 | Takekado et al. ......... | 360/78.05 |
| 5,898,541 A | * | 4/1999 | Boutaghou et al. ...... | 360/294.4 |
| 6,046,883 A | * | 4/2000 | Miller ...................... | 360/245.7 |
| 6,064,550 A | * | 5/2000 | Koganezawa ............. | 360/294.3 |
| 6,067,209 A | * | 5/2000 | Aoyagi et al. ............ | 360/245.7 |
| 6,078,473 A | * | 6/2000 | Crane et al. .............. | 360/294.3 |
| 6,191,915 B1 | * | 2/2001 | Takagi et al. ............. | 360/245.7 |
| 6,222,706 B1 | * | 4/2001 | Stefansky et al. ........ | 360/294.5 |
| 6,256,175 B1 | * | 7/2001 | Zhang ...................... | 360/294.5 |
| 6,297,936 B1 | * | 10/2001 | Kant et al. ................ | 360/294.4 |

* cited by examiner

*Primary Examiner*—David L. Ometz
(74) *Attorney, Agent, or Firm*—Westman, Champlin & Kelly

(57) ABSTRACT

A head suspension assembly, particularly useful in a disc drive that incorporates a head/microactuator assembly and dynamic loading and unloading of the head/microactuator assembly into and out of operative engagement with a disc. The head suspension includes a gimbal that that mounts the head/microactuator assembly via the microactuator, and thus allows the head assembly to be microstepped by the microactuator. The gimbal further includes reverse bending features providing increased pitch attitude compliance, and limiting features which interact with cooperative lifting features on the rigid beam of the head suspension to control the static attitude extremes of the head assembly during dynamic unloading of the head/microactuator assembly from operative engagement with a disc. In a further aspect of the invention, the head suspension includes mechanisms for controlling the attitude of the head/microactuator assembly relative to the disc during dynamic loading of the head/microactuator into operative engagement with the disc.

21 Claims, 7 Drawing Sheets

SUSPENSION GIMBAL WITH REDUCED PITCH STIFFNESS, COMPLIANT PRELOADING BRIDGE AND UNLOADING LIMITERS

CROSS-REFERENCE TO RELATED APPLICATION

This Application claims the benefit of United States Provisional Application Ser. No. 60/117,791, filed Jan. 29, 1999.

BACKGROUND OF THE INVENTION

This invention relates generally to the field of rigid disc drives, and more particularly, but not by way of limitation, to an improved head suspension, which is particularly useful with head assemblies incorporating microactuators.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Reduction of individual bit domain size, along with improved servo systems, allowed for greatly increased track densities, that is the number of data tracks recorded in a given radial region of the disc surface. Disc drives of the current technology are capable of recording and retrieving data with track densities of 10,000 tracks per inch (tpi) or greater, and increases in track density have come to be limited by the mechanical precision of the actuator assemblies used to move the head assemblies from track to track. For instance, as track density approaches 20,000 tpi, mechanical tolerance limitations in the ball bearing assemblies incorporated in the rotary actuator begin to approach the on-track tolerance allowance at the read/write transducers. Piezo-electric actuators have been incorporated in the head mounting arm/head suspension assemblies that allow for repeatable transducer positioning at track densities up to the order of 50,000 tpi, at which point such secondary actuators reach their precision limitations. This limitation has lead to the development of microactuators associated directly with the head assemblies.

Disc drives incorporating such microactuators utilize pre-recorded servo information recorded on the disc surfaces to first of all position the rotary actuator described above to the approximate location of the desired data track. The microactuator associated with the individual data head is then used to finely position the head assembly in operative relationship to the data track, and maintain the necessary track following for subsequent data transfers.

Details of the operation of a magnetic microactuator (MAGMA) are disclosed in co-pending U.S. patent application Ser. No. 09/315,006, filed May 19, 1999. Prior art mechanisms related to head suspensions for supporting such head/microactuator assemblies are disclosed in co-pending U.S. patent application Ser. No. 09/306,581, filed May 6, 1999, and PCT Application Ser. No. PCT/US97/21819, filed Nov. 14, 1997. All of the noted applications are assigned to the assignee of the present application and incorporated herein by reference.

The incorporation of microactuators in disc drives, especially in those disc drives which also utilize dynamic loading and unloading of the head, has necessitated modification of the head suspensions used to mount and support the head/microactuator assemblies. In particular, it has become desirable to reduce the pitch attitude stiffness of the gimbal, in order to allow a greater tolerance range in pitch static attitude, leading to higher production yields in the manufacturing process with associated lowered component costs.

It has also been found that, for disc drives incorporating dynamic loading and unloading of the head assemblies, mechanically limiting the movement of the gimbal relative to the load beam of the head suspension assembly aids in providing a robust relationship between the head assemblies and the disc surface at the time of engagement and disengagement between the heads and discs, thus reducing the possibility of damaging head/disc contact or damage to the head suspension.

The present invention provides a head suspension which mounts the head/microactuator assembly in a manner which allows free movement of the head assembly relative to the microactuator, which includes features for reducing pitch attitude stiffness, and features for controlling static attitude of the head/microactuator assembly during head unloading and head loading operations.

SUMMARY OF THE INVENTION

The present invention is a head suspension assembly, particularly useful in a disc drive that incorporates a head/microactuator assembly and dynamic loading and unloading of the head/microactuator assembly into and out of operative engagement with a disc. The head suspension includes a gimbal that mounts the head/microactuator assembly via the microactuator, and thus allows the head assembly to be microstepped by the microactuator. The gimbal further includes reverse bending features providing increased pitch attitude compliance, and limiting features which interact with cooperative lifting features on the rigid beam of the head suspension to control the static attitude extremes of the head assembly during dynamic unloading of the head/microactuator assembly from operative engagement with a disc. In a further aspect of the invention, the head suspension includes mechanisms for controlling the attitude of the head/microactuator assembly relative to the disc during dynamic loading of the head/microactuator into operative engagement with the disc.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
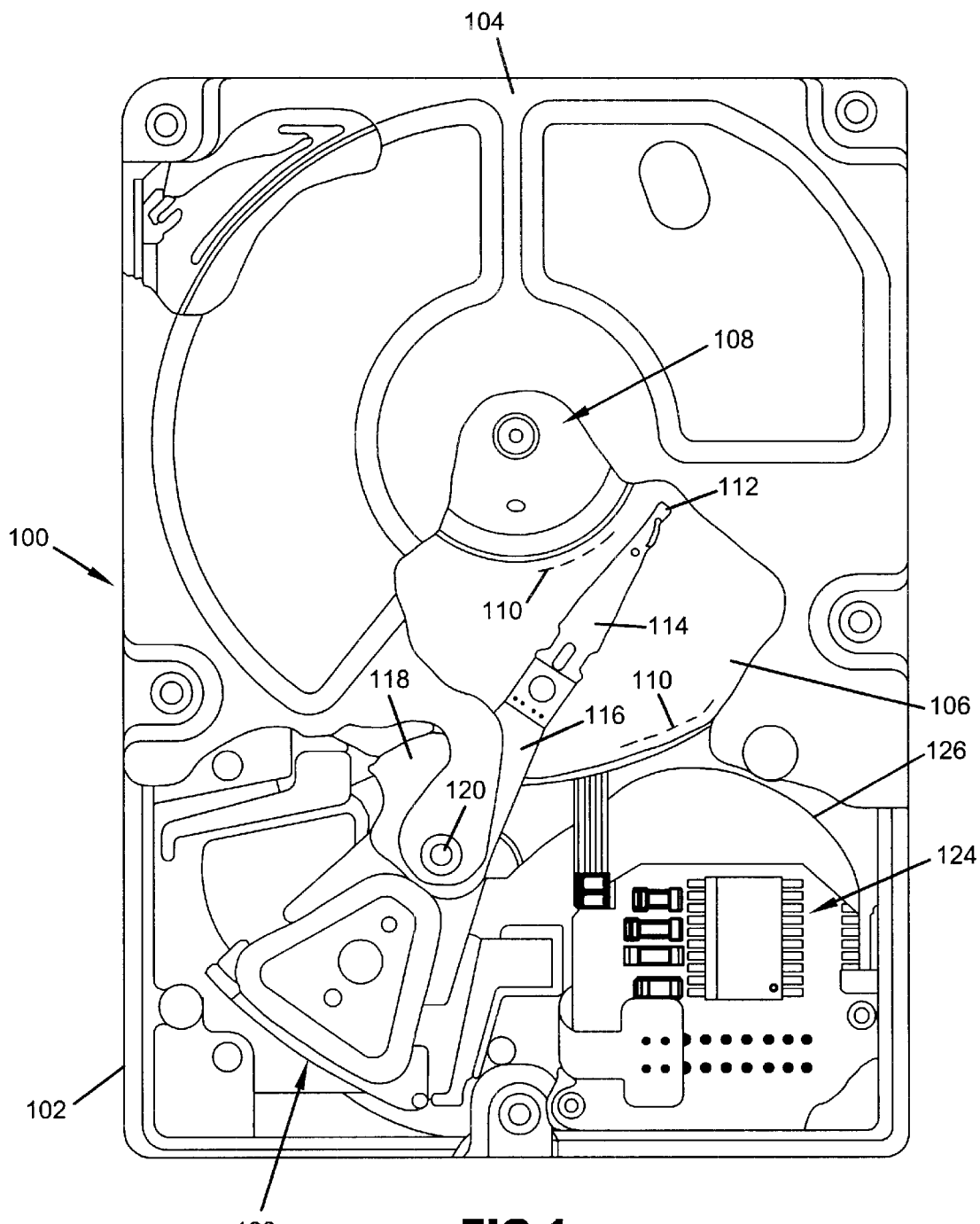
FIG. 1 is a plan view of a prior art disc drive.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

As previously mentioned above, areal recording density in disc drives is constantly increasing, and track density, the number of data tracks 110 within a given radial space on the discs 106, is anticipated to reach 50,000 tracks per inch (tpi) or greater. Referring to FIG. 1, if it is envisioned that the head assembly 112 must be moved radially only one-fifty-thousandth of an inch, it is apparent that the rotary motion at the pivot shaft 120 must be extremely small. In fact, the preload forces applied to the pivot ball bearings to provide a "stiff" pivot are large enough to plastically deform the balls and races in the ball bearing assemblies to the point where the required small rotary motion for such movement of the head assemblies 112 does not truly cause the balls in the ball bearings to roll at all, effectively limiting the precision of the actuator. Since the actuator motor 122 is incapable of providing rotary motion in small enough increments for track densities of this order, another mechanism must be provided for positioning of the head assemblies 112. The incorporation of microactuators directly associated with each head assembly provides the necessary precision.

The head suspension 114 is composed of several different functional portions, not separately designated in the figure: 1) a robust mounting portion, which provides a strong attachment for the head suspension 114 to the actuator head mounting arm 116; 2) a spring portion, which provides a load force toward the disc 106 to dynamically balance the hydrodynamic lifting force of the head assembly 112, and establish the flying height and attitude of the head assembly 112 above the disc 106; 3) a rigid beam portion for transferring the load force produce by the spring portion; and 4) a gimbal portion, which mounts the head assembly 112, is compliant in the pitch and roll axes of the head assembly 112 to allow the head assembly 112 to follow minor surface variations in the disc 106, and is stiff in the yaw and in-plane axes of the head assembly 112 to allow accurate positioning of the head assembly 112 relative to the data tracks 110. The present invention is specifically directed to modifications to the rigid beam portion and gimbal portion of the head suspension, as will be discussed in detail hereinbelow.

Figure 2:
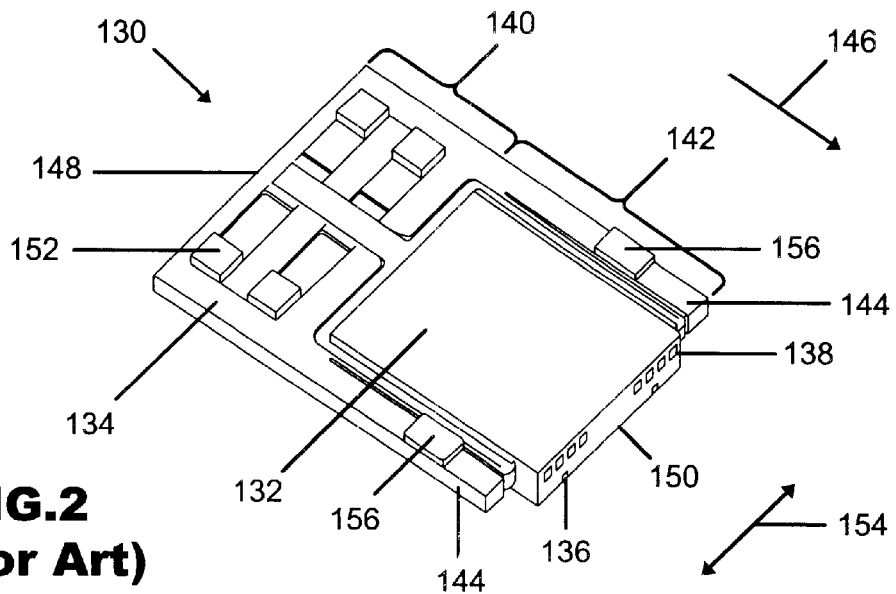
FIG. 2 is an isometric view of certain elements of a head/microactuator assembly with which the present invention is particularly useful.

FIG. 2 is an isometric view of a head/microactuator assembly 130, such as is disclosed in the previously incorporated '006 application. The head/microactuator assembly 130 is comprised of a head assembly 132 and a microactuator assembly 134.

The head assembly 132 is, in turn comprised of elements well known in the art, including a slider body (not separately designated) which mounts at least one data transducer 136 and associated terminal pads 138 to which signal wires (not shown) are attached.

The microactuator 134 comprises a micromotor portion 140 and a lateral arm portion 142, with the lateral arm portion 142 comprising, in turn, a pair of laterally opposed arm/spring members 144.

The direction of disc rotation relative to the head/microactuator assembly 130 is shown by arrow 146. Thus the head/microactuator assembly 130 has a leading edge 148 and a trailing edge 150, which are the first and last portions, respectively, of the overall assembly 130 beneath which any given portion of the disc passes.

Details of the operation of the microactuator are disclosed in full in the previously incorporated '006 application. For purposes of this disclosure, it is sufficient to know that, when control signals of the proper magnitude and polarity are applied to the micromotor terminals 152, the head assembly 132 is microstepped between the arm/spring members 144 in the direction of arrow 154, in order to properly align the data transducer 136 with the desired data track (110 in FIG. 1).

Since the head assembly 132 must be free to move laterally between the arm/spring portions 144 of the microactuator 134, any head suspension assembly used to mount the head/microactuator assembly 130 must be designed in such as manner as to not interfere with this lateral motion of the head assembly. This requirement is satisfied by the head suspension assembly of the present invention.

FIG. 2 also shows standoffs 156 on each of the arm/spring members 144, the surfaces of which are coplanar with the surfaces of the micromotor terminals 152, and extend above the top surface of the head assembly 132.

Figure 3:
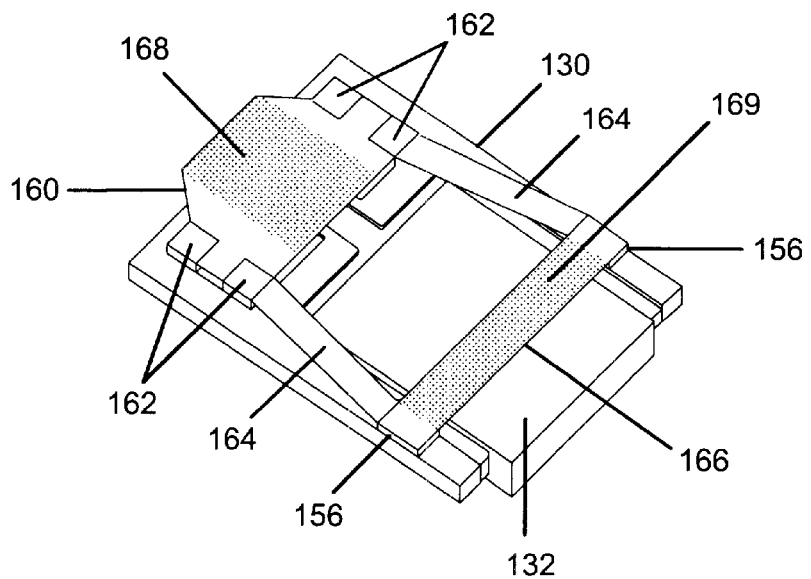
FIG. 3 is an isometric view of the head/microactuator assembly of FIG. 2, further showing a flex circuit carrying control signals to the microactuator.

Turning now to FIG. 3, shown is a head/microactuator assembly 130, similar to that of FIG. 2, and a flex circuit 160. The flex circuit 160 includes conductive signal paths (not shown) that carry electrical control signals to the microactuator motor through soldered electrical connections at 162, connecting arms 164 extending to the standoffs 156 and a bridging portion 166 which overlies the head assembly 132 in certain embodiments of the invention. In the embodiments of the invention which include the connecting arms 164 and bridging portion 166, it is envisioned that the flex circuit will be bonded to the standoffs 156. When it is recalled that the tops of the standoffs 156 extend above the upper surface of the head assembly 132, it is apparent that the bridging portion 166 of the flex circuit 160 is also disposed above the head assembly 132, a fact which will be of significance in discussion to follow.

It is presently envisioned that assembly of the elements of FIG. 3 to other head suspension components will be accomplished by application of an appropriate bonding agent, such as epoxy, in the shaded areas 168, 169 of the flex circuit 160 overlying the microactuator motor portion (134 in FIG. 2) and the head assembly 132, respectively.

Figure 4:
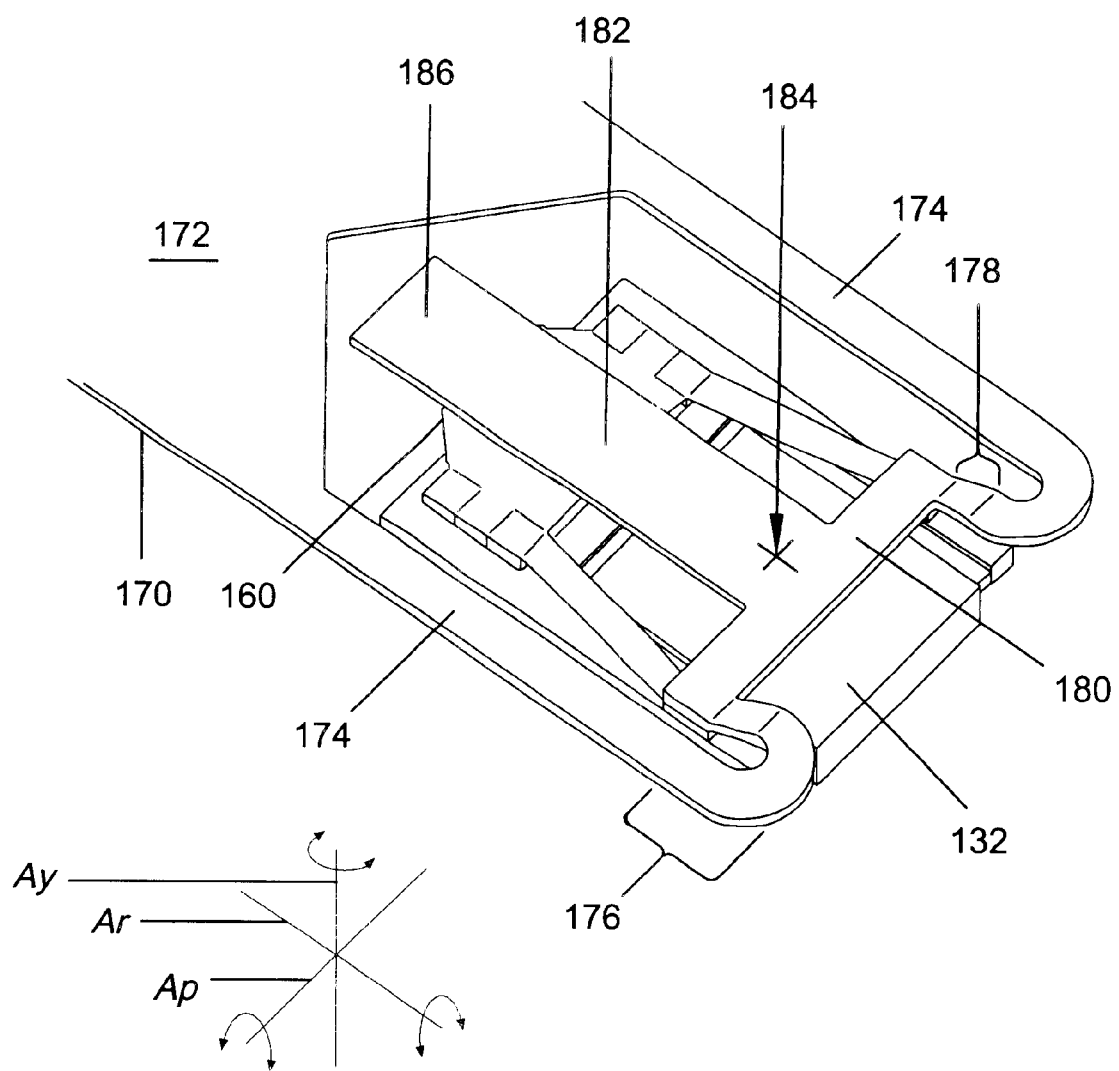
FIG. 4 is an isometric view of a portion of a first embodiment of the gimbal of the present invention as assembled to the head/microactuator assembly of FIGS. 2 and 3.

FIG. 4 is an isometric view showing a head/microactuator/flex circuit assembly, such as that of FIG. 3, and portions of a first embodiment of a gimbal 170 which forms a part of the present invention.

The gimbal 170 includes a mounting portion, shown partially at 172, which is intended for fixed attachment to the lower surface of a rigid beam portion (not shown). It will be recalled from earlier discussion, that the general functions of the gimbal portion of a head suspension are: 1) to mount the head assembly; 2) to provide compliance in the pitch and roll axes of the head assembly, to allow the head assembly to follow minor surface variations in the disc; and 3) to be stiff in the yaw and in-plane axes of the head assembly, to provide accurate positioning of the head assembly relative to data tracks on the disc. When the head suspension is intended for use with a head/microactuator assembly, the gimbal must also further allow for the transfer of the load force, provided by the spring portion of the head suspension and transferred by the rigid beam portion, to the head assembly without impeding the action of the microactuator.

To achieve these multiple goals, the gimbal 170 of FIG. 4 can be seen to include a pair of laterally disposed, longitudinally extending gimbal beams 174 which extend in a substantially coplanar manner from the mounting portion 172. Because of their orientation, these gimbal beams 174 are compliant in the pitch and roll axes, $A_p$ and $A_r$, respectively, of the head assembly 132, and stiff in the yaw axis, $A_y$, and the in-plane axes parallel with the pitch and roll axes, $A_p$ and $A_r$.

In order to increase compliance in the pitch axis, $A_p$, the distal ends of the gimbal beams 174 include reverse bend portions 176, which curve laterally inward toward each other, and back toward the mounting portion 172. At the ends of the reverse bend portions 176, the gimbal 170 includes a double bend portion 178 that inclines first downward out of plane with the mounting portion 172 and gimbal beams 174, and then back into substantially parallelism with the mounting portion 172 and gimbal beams 174. The amount of out-of-plane displacement created by the double bend 178 is selected to match the height by which a load point protrusion (not shown) extends below the lower surface of a cooperative rigid beam element, as will be discussed further below.

The central, out-of-plane portion of the gimbal 170 provides elements for mounting the head/microactuator assembly, as well as a location for applying the load force from the rigid beam portion of the head suspension. Specifically, in this embodiment, the gimbal 170 includes a bridging element 180 which overlies the corresponding bridging portion (166 in FIG. 3) of the flex circuit 160. Extending proximally from the bridging element 180 is a central tongue 182 which extends over the portion of the flex circuit 160 which overlies the microactuator motor.

When it is recalled that the shaded portions designated 168 and 169 in FIG. 3 will be coated with a bonding agent, such as epoxy, it is apparent that the mounting function of the gimbal 170 is provided by adhesive bonding of the bridging element 180 to the bridging element (166 in FIG. 3) and of the central tongue 182 to the portion of the flex circuit 160 over the microactuator motor portion (140 in FIG. 2).

The gimbal 170 also provides a location for application of the load force, provided by the spring portion of the head suspension, at the load point designated by arrow 184. The position of the load point 184 relative to the head/microactuator assembly (130 in FIG. 2) is selected to provide the desired flying attitude to the head assembly (132 in FIG. 2). The manner in which the rigid beam portion of the head suspension of the present invention interacts with the gimbal 170 to accomplish this load application will be discussed in more detail hereinbelow.

Since the standoffs 156 extend above the upper surface of the head assembly 132, the load force applied at the load point 184 is exerted through the bridging element 180 to the standoffs 156, and through the central tongue 182 to the micromotor portion (140 in FIG. 2) via the flex circuit 160. Since the load force is applied to the head assembly 132 solely via the microactuator, the head assembly is thus free to move relative to the microactuator Finally, as can be seen in FIG. 4, the central tongue 182 of the gimbal 170 can be seen to extend proximally beyond the leading edge (148 in FIG. 2) of the head/microactuator assembly (130 in FIG. 2), to form a gimbal leading edge lifting feature 186, the function of which will also be detailed in subsequent discussion.

Figure 5:
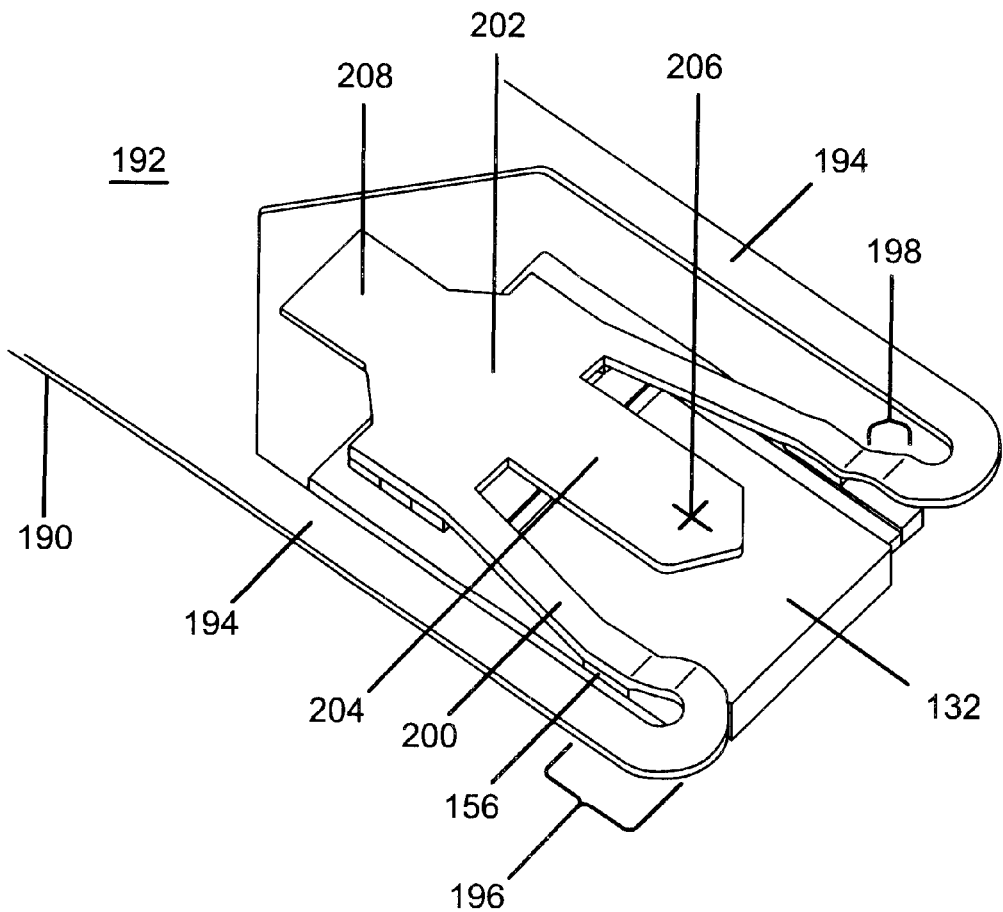
FIG. 5 is an isometric view, similar to that of FIG. 4, showing a portion of a second, presently preferred, embodiment of the gimbal of the present invention.

Turning now to FIG. 5, shown is an isometric view of a second, and presently preferred, embodiment of a gimbal 190, which forms a part of the present invention, as assembled to a head/microactuator assembly, such as that designated 130 in FIG. 2.

Similarly to the first embodiment of FIG. 4, the gimbal 190 includes a mounting portion, shown partially at 192, and a pair of laterally disposed gimbal beams 194, the distal ends of which are formed with reverse bend portions 196, to increase compliance of the gimbal 190 in the pitch axis, $A_p$, as defined in FIG. 4. Again similarly to the embodiment of FIG. 4, the inner ends of the reverse bend portions 196 include double bend portions 198, which displace the central elements of the gimbal 190 into a substantially parallel, but out-of-plane, relationship with the mounting portion 192 and gimbal beams 194.

The principal difference between the embodiments of FIGS. 4 and 5 lies in the absence of a bridging element (180 in FIG. 4) in the embodiment of FIG. 5. Instead, the embodiment of FIG. 5 includes connecting arms 200 lying between the areas where the gimbal 190 is bonded to the standoffs 156 and a central bonding portion 202, where the gimbal 190 is envisioned to be adhesively bonded to the portion of the flex circuit overlying the microactuator motor. Thus, the mechanical mounting of the head/microactuator assembly to the gimbal 190 is similar to that of the embodiment of FIG. 4.

The embodiment of FIG. 5 includes a cantilevered, or "diving board", portion 204 which extends distally from the central bonding portion 202, and includes a location for application of the head suspension loading force, or load point, as designated at 206. Once again, the location of the load point 206 relative to the head/microactuator assembly is selected to provide the desired flying attitude of the head assembly 132.

It should be noted that, since there is no bridging element lying between the standoffs 156, and, thus, no mounting bonding at this location, the flex circuit (160 in FIG. 3) can be simplified to lie solely above the microactuator motor portion of the head/microactuator assembly. Maintenance of the desired parallel relationship between the central bonding portion 202, the cantilevered portion 204, and the upper surface of the head assembly can be provided by increasing the height of the standoffs 156 by an amount equal to the thickness of the flex circuit connected to the micromotor terminals (152 in FIG. 2).

Once again, it should be noted that, since the standoffs 156 and micromotor terminals extend above the upper surface of the head assembly 132, the cantilevered portion 204 to which the load force is applied at the load point 206 will also lie above and out of contact with the head assembly 132, allowing free movement of the head assembly 132 relative to the microactuator.

FIG. 5 also shows a gimbal leading edge lifting feature 208, the function of which will also be detailed in subsequent discussion.

Figure 6:
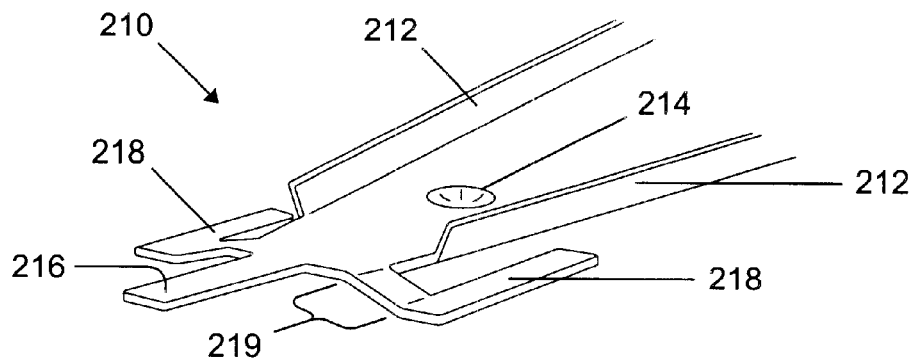
FIG. 6 is a detail perspective view of a distal portion of a load beam made in accordance with the present invention.

FIG. 6 is an isometric view of a distal portion of a rigid beam portion 210 of the head suspension of the present invention.

As will be appreciated by those of skill in the art, the principal function of the rigid beam portion 210 of a head suspension is to transfer the load force generated by the spring portion (not shown) of the head suspension to the gimbal portion (also not shown in FIG. 6), and thence to the head assembly. To accomplish this function, the rigid beam portion 210 must be, as the name implies, stiff and unbending. These characteristics are provided by forming the rigid beam portion 210 from material stock that is relatively thicker than the material used for the gimbal portion, and further by typically forming the lateral edges of the rigid beam portion 210 into side rails 212 by bending the lateral edges out-of-plane from the rest of the rigid beam portion 210. While FIG. 6 shows the side rails 212 as formed by a single bend, it is well known in the industry to provide side rails formed with multiple or complex bends, such as V-shaped or U-shaped channels, which can also be utilized as pathways for the routing of the signal wires (not shown) used to carry data to and from the head assemblies. Therefore the scope of the present invention is not envisioned to be limited by the specific form of the side rails 212 of the rigid beam portion 210.

FIG. 6 also shows that the rigid beam portion 210 includes a dimple 214 which acts to localize the load force provided by the spring portion of the head suspension, and pass the load force through "single-point contact" to the gimbal portion, as will be discussed in more detail below. It should also be noted that, even though the figure shows a conventional stamped dimple 214, the scope of the present invention is envisioned to include other forms of load point protrusions, such as those formed by half-etching processes or material deposition processes. Therefore, the scope of the present invention is not envisioned as being limited by the specific form of the load point protrusion on the rigid beam portion 210 of the head suspension, and the stamped dimple 214 should, therefore, be considered as exemplary of any form of load point projection for purposes of this disclosure.

The rigid beam portion 210 of FIG. 6 also includes, at its distal extreme, a ramp contact feature 216, intended to interact with a ramp structure positioned at the outer diameter of an associated disc to lift the head assembly mounted on the head suspension out of cooperative engagement with the disc, in a manner well known in the art. While the figure shows the ramp contact feature 216 as a planar extension from the rigid beam portion 210, one of skill in the art will appreciate that the ramp contact feature 216 could readily assume other forms without exceeding the envisioned scope of the present invention.

Finally, FIG. 6 shows that the rigid beam portion 210 includes, near its distal end, a pair of laterally disposed, longitudinally extending lift displacement limiting features 218, which are specific to the head suspension of the present invention. As can be seen in FIG. 6, the lift displacement limiting features are displaced out-of-plane from the central region of the rigid beam portion 210 by the presence of a double-bend region 219.

The lift displacement limiting features 218 are intended to interact with particular portions of the associated gimbal portion (not shown in FIG. 6) in a manner to be discussed below.

The specific element relationships that provide the advantages and benefits of the head suspension of the present invention are shown in FIGS. 7 through 10, discussion of which will now be undertaken.

Figure 7:
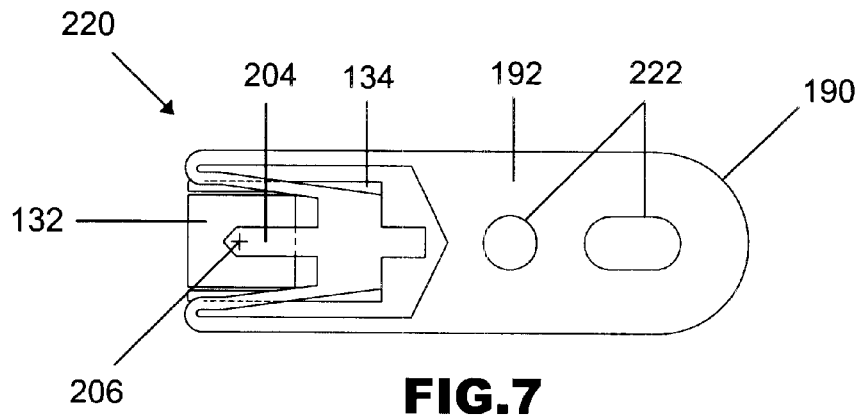
FIG. 7 is a top plan view of a gimbal, made in accordance with the present invention, in operative relationship to a head/microactuator assembly, such as the assembly shown in FIG. 5.

FIG. 7 is a plan view of a head/microactuator/gimbal assembly 220 made up of a head/microactuator assembly, such as that designated 130 in FIG. 2, mounted to a gimbal 190, such as that of FIG. 5. For purposes of this disclosure, it should be noted that similar functional relationships can be obtained with the gimbal 170 of FIG. 4, and the inclusion of the presently preferred embodiment gimbal 190 is exemplary, rather than limiting to the envisioned scope of the invention.

The head/microactuator assembly consists of a head assembly 132 and a microactuator assembly 134 as previously described.

As can be seen in the figure, the gimbal 190 includes a mounting portion 192, intended for fixed attachment to a rigid beam portion (not shown) by, for example, laser welding. The mounting portion 192 of the gimbal 190 also includes tooling features 222 used for alignment of the gimbal 190 to the associated rigid beam portion during such attachment.

As in FIG. 5, the gimbal 190 includes a central cantilevered portion 204 which overlies the head assembly 132 and is disposed above the upper surface of the head assembly 132 in a non-contacting manner to permit the microactuator 134 to microstep the head assembly, as previously explained. A load point 206 is also provided on the cantilevered portion 204, at which load point 206 the load force of the head suspension will be applied to establish the desired flying attitude of the head assembly 132.

Figure 8:
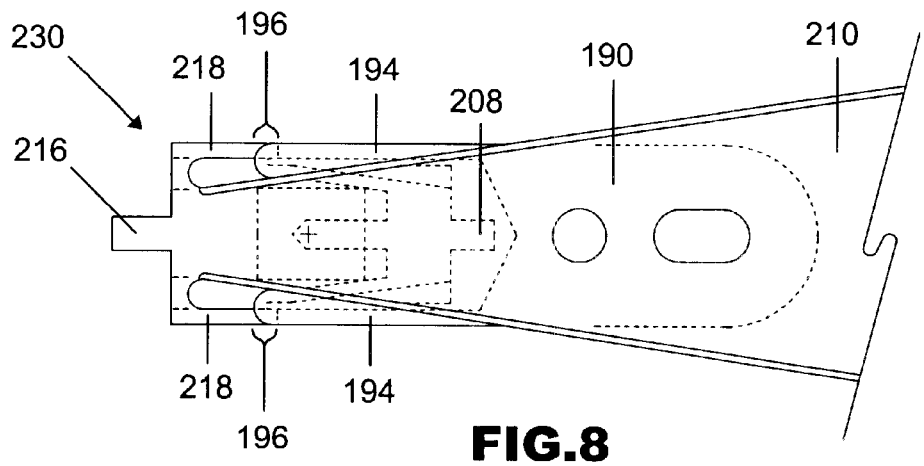
FIG. 8 is a top plan view of a head/head suspension assembly made in accordance with the present invention.

FIG. 8 is a plan view of relevant portions of a head/head suspension assembly 230 made in accordance with the present invention. The head/head suspension assembly 230 includes a rigid beam portion 210, similar to that described above in relationship to FIG. 6, a gimbal 190, similar to that described above in relationship to FIGS. 5 and 7, and a head/microactuator assembly (not designated in this figure) similar to that described above in relationship to FIGS. 2–5 and 7.

FIG. 8 shows that the gimbal beams 194 of the gimbal 190, along with their associated reverse bend portions 196, lie substantially laterally outward of the side rails (212 in FIG. 6) of the rigid beam portion 210, allowing the gimbal beams 194 and reverse bend portions 196 to flex freely and thus provide the desired compliance in the pitch and roll axes of the head assembly (132 in FIGS. 2–5 and 7).

When the gimbal 190 and rigid beam portion 210 are properly aligned—as ensured by matching of the tooling features (222 in FIG. 7) in the gimbal and corresponding features (not designated) in the rigid beam—and fixed together, the extreme ends of the lift displacement limitation features 218 of the rigid beam portion 210 are disposed beneath the reverse bend portions 196 of the gimbal beams 194. To provide the desired relationship between the lift displacement limiting features 218 and the reverse bend portions, the present invention envisions that the double bend portions (219 in FIG. 6) displace the upper surfaces of the lift displacement limiting features 218 below the upper surface of the central portion of the rigid beam portion 210 by a distance greater than the thickness of the material of the gimbal portion 190. Thus—as will be discussed in more detail hereinbelow—during normal operating conditions, there will be no contact between the lift displacement limiting features 218 and the reverse bend portions 196 of the gimbal 190, and the reverse bend portions 196 and gimbal beams 194 are free to flex and provide the desired compliance.

FIG. 8 also shows the relative locations of the ramp contact feature 216 at the far distal end of the rigid beam portion 210 and the head assembly (132 in FIGS. 2–5 and 7), and shows that the ramp contact feature 216 can interact with an associated ramp structure without causing undesirable contact between the ramp structure and the head assembly.

Also shown in FIG. 8 is a gimbal leading edge lifting feature 208, the function of which will be made clear in subsequent discussion.

Figure 9:
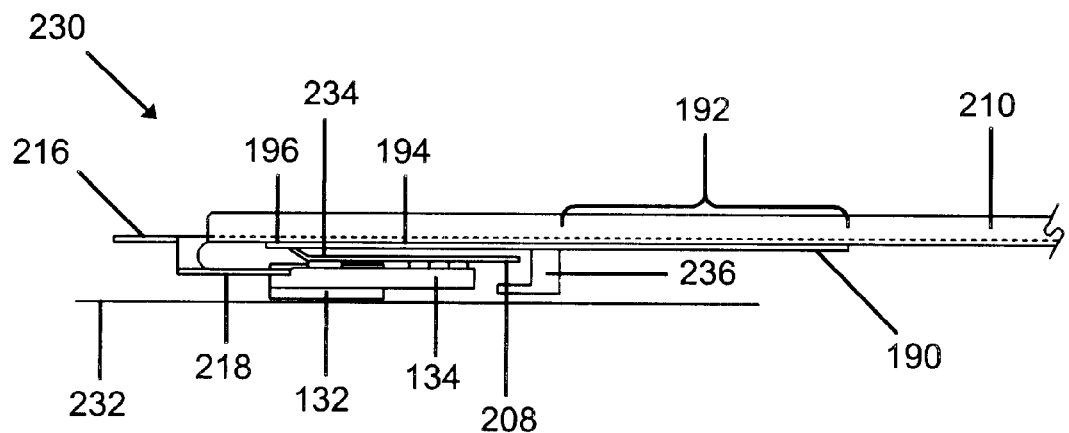
FIG. 9 is a side elevation view of a head/head suspension assembly, such as that of FIG. 8, in cooperative engagement with a disc surface.

Turning now to FIG. 9, shown is a side elevation view of the head/head suspension assembly 230 of the present invention, with the head assembly 132 engaged in normal operating relationship to a disc surface 232. As will be apparent to those of skill in the art, in FIG. 9, relative vertical dimensions have been greatly exaggerated for illustrative purposes.

FIG. 9 shows that, during normal operation, the upper surfaces of the gimbal beams 194 and mounting portion 192 of the gimbal 190 are substantially coplanar with the lower surface of the rigid beam portion 210. Indeed, the mounting portion of the gimbal 190 is fixedly attached, as by laser welding, to the rigid beam portion 210.

The double bend portions (178 in FIG. 4, 198 in FIG. 5) at the ends of the reverse bend portions 196 serve to vertically displace the central elements of the gimbal 190— via which the head/microactuator assembly is attached— below the plane of the gimbal beams 194, while providing for a substantially parallel relationship between the gimbal beams 194 and the air bearing surfaces (not designated) of the head assembly 132.

The load force generated by the spring portion (not shown) of the head suspension is applied through the load point protrusion 234 of the rigid beam through the cantilevered portion (204 in FIG. 5)—or corresponding central tongue 182 in the embodiment of FIG. 4—to the microactuator and thence to the head assembly 132.

Thus, during normal operation, the head assembly 132 is able to tilt in its pitch and roll axes about the load point (184 in FIG. 4, 206 in FIGS. 5 and 7) within the compliance limitations of the gimbal beams 194 and reverse bend portions 196.

FIG. 9 also shows the presence of a leading edge limit feature 236 which is fixedly mounted to either the gimbal 190 or rigid beam portion 210, and which extends beneath the gimbal leading edge lifting feature 208 (or comparable element 186 in the embodiment of FIG. 4). During normal operation, this leading edge limit feature 236 contacts no other elements and has no effect on operation.

Figure 10:
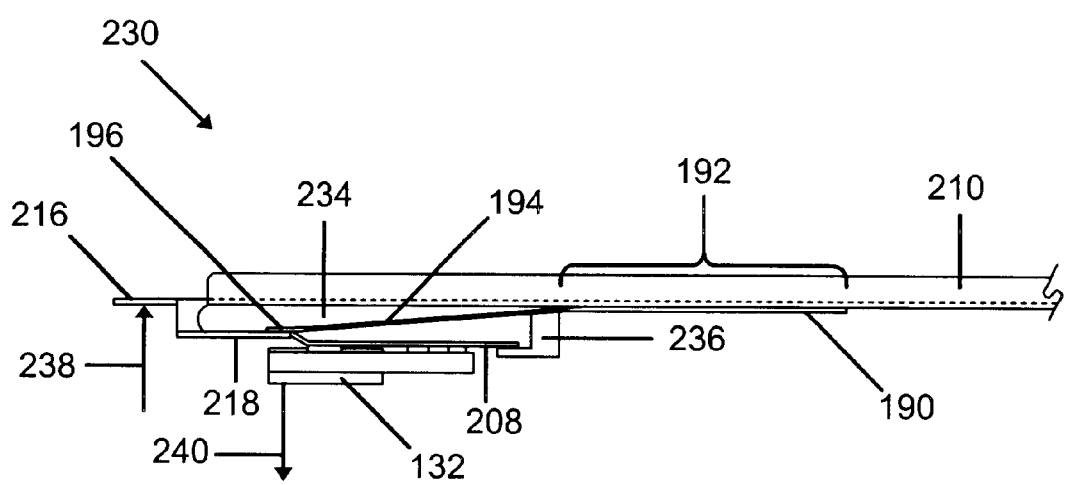
FIG. 10 is a side elevation view of the head/head suspension assembly of FIG. 9 in an unloaded condition.

FIG. 10 is a side elevation view, similar to FIG. 9, showing the effect on system elements of ramp unloading of the head suspension of the present invention.

When it is desired to remove the head assembly 132 from operative engagement with the disc—such as at the detection of power loss—the rotary actuator motor (122 in FIG. 1) rotates the actuator body to move the head assemblies toward the outer diameter of the discs. As the heads approach the disc outer diameters, the ramp contact feature 216 comes into contact with a cooperative ramp structure (not shown) and a lifting force is exerted on the ramp contact feature 216 in the direction shown by arrow 238. At the same time, inertial forces and hydrodynamic suction at the head/disc interface exert a force in the opposite direction on the head assembly 132, as shown by arrow 240.

The effect of these opposing forces exerted on differing elements of the head/head suspension assembly 230 is to bend the gimbal arms 194 away from their normal coplanar relationship with the lower surface of the rigid beam portion 210, as shown in the figure. Indeed, if there were no intervening elements, the gimbal beams 194 could be bent to the extent that they become permanently deformed, imparting undesirable static attitude characteristics to the head assembly 132.

Instead, with the head suspension of the present invention, as the gimbal beams 194 bend away from the rigid beam portion 210, the reverse bend portions 196 contact the lift displacement limiting features 218 on the rigid beam portion 210, and the maximum displacement of the gimbal beams 194 is reached short of the point which could permanently damage the delicate gimbal components.

Modeling of head suspensions that included such two-point limiting of gimbal motion revealed high levels of stress in the system elements, leading to the development of a three-point limiting system, which includes not only the lift displacement limiting features 218 near the distal ends of the gimbal 190, but further included the leading edge limit feature 236 and cooperative elements on the gimbal 190, such as the gimbal leading edge lifting feature 208 (and comparable element 186 in the embodiment of FIG. 4).

As seen in FIG. 10, when the gimbal beams 194 are bent to the extent of causing contact between the reverse bend portions 196 of the gimbal beams 194 and the lift displacement limit features 218, there is a tendency for the proximal portions of the gimbal—with the attached head/microactuator assembly—to rotate clockwise in the figure. This tendency is countered, however, by contact between the gimbal leading edge lifting feature 208 on the gimbal 190 and the leading edge limit feature 236. Proper dimensioning of the various lift limit components will act to maintain the head assembly 132 in a substantially parallel relationship with the disc surface (232 in FIG. 9) even when the gimbal is displaced by lifting forces away from its normal contact with the load point protrusion 234, as shown in FIG. 10.

It will be appreciated by those of skill in the art that, when the force attracting the head assembly to the disc is completely overcome, the spring characteristics of the gimbal 190 will act to bring the load point (184 in FIG. 4, 206 in FIGS. 5 and 7) of the gimbal 190 back into contact with the load point protrusion 234, as shown in FIG. 9.

It should also be recalled that similar forces to the ones illustrated in FIG. 10 can result from the application of mechanical shock to the disc drive, in which case, any shock of great enough magnitude to lift the head assembly away from the normal operational relationship with the disc would also cause the lift limiting features described above to come into operation, protecting the gimbal 190 from excess distortion and possible damage.

A final aspect of the invention is directed to preventing static attitude variations in the gimbal from having negative effects, especially during loading of the head assemblies off the ramps into engagement with the discs.

It will be recalled from the discussion of FIG. 10 above that when the head assemblies 132 are totally disengaged from the disc surfaces, the spring characteristics of the gimbal elements act to bring the load point (184 in FIG. 4, 206 in FIGS. 5 and 7) of the gimbal 190 back into contact with the load point protrusion 234 of the rigid beam portion 210 of the head suspension. However, in such a condition there is no air bearing beneath the head assembly 132 to act in opposition to variations in static attitude imposed by variability in the formation of the gimbal components. That is, while the load point of the gimbal 190 is in contact with the load point protrusion 234 of the rigid beam portion 210, there is nothing to prevent the head assembly 132 from assuming a non-parallel attitude with relation to the disc surface, should the gimbal elements vary from their nominal condition.

While this variation in static attitude of the head assembly 132 is not of particular significance during unloading of the head assembly from the disc, excessive pitch or roll variation of the head assembly at the time the head assembly is being brought into cooperative engagement with the disc could cause the head assembly to land with an edge or corner of the head assembly in contact with the disc, leading to potential damage to the head, the disc or both.

It would, therefore, be desirable to provide a mechanism for maintaining substantial parallelism between the head assembly 132 and the disc as the head assembly 132 is brought into engagement with the disc.

As noted above, when the limiting features of the head suspension of the present invention are engaged, as shown in FIG. 10, the head assembly is kept in such a substantially parallel relationship with the disc surface. If a mechanism can be provided which overcomes the spring characteristics of the gimbal elements and which maintains the limit features in contact during unloaded conditions, the desired substantially parallel relationship between the head assembly and the disc can be established and maintained as well. The aspect of the present invention described below with regard to FIGS. 11 and 12 provides such a mechanism.

Figure 11:
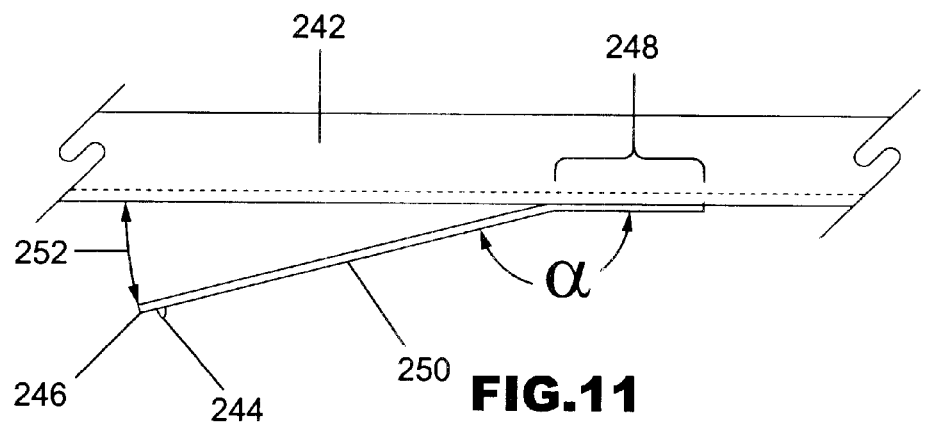
FIG. 11 is an extreme closeup side elevation view of a portion of a load beam assembly made in accordance with another aspect of the present invention

Turning now to FIG. 11, shown is an extreme closeup side elevation view of a rigid beam portion 242 which has been modified in accordance with the final aspect of the invention.

The load spring portion 242 does not have the load point protrusion formed directly thereon, as shown in the previous embodiment in FIG. 6. Instead, the load point protrusion 244 is formed on a load point spring element 246. The load point spring element 246 further comprises a mounting portion 248 fixedly attached to the lower surface of the rigid spring portion 242 and a cantilevered portion 250 which is bent at an angle α away from the rigid spring portion 242. One of skill in the art will appreciate that the spring force exerted by the load spring element 246 at the load point protrusion 244 in relationship to the rigid beam member 242 will be dependent on a variety of factors, including the material of the load point spring element 246, the angle α, and the distance of the load point protrusion 244 from the mounting portion 248. In accordance with the present invention, selection of this spring force will be based on several criteria: 1) the spring force must be large enough to overcome the spring characteristics of the gimbal, and maintain the limiting features in contact during unloaded conditions; 2) the spring force must be small enough to be substantially overcome by the spring force generated by the spring portion of the head suspension during loaded conditions; and 3) the angle α and dimension between the load point protrusion 244 and the mounting portion 248 must be selected such that the total displacement 252 between the rigid beam portion 242 and the preformed load point spring element 246 must be greater than the total excursion that the cantilevered portion 250 can undergo when combined with the limiting features already described.

Figure 12:
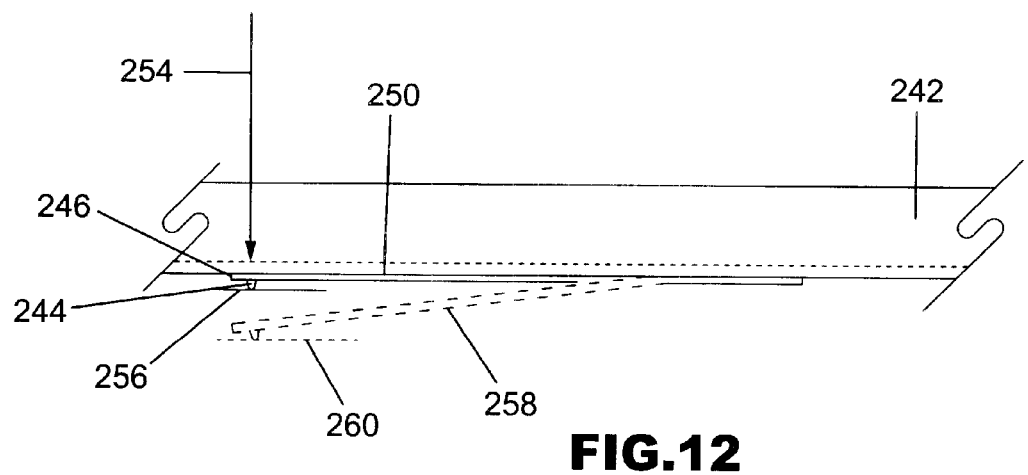
FIG. 12 is an extreme closeup side elevation view, similar to that of FIG. 11, showing relationships of elements of the additional aspect of the present invention during operational and nonoperational conditions.

Operation of the modified rigid beam portion 242 in relationship to the head suspension already described is illustrated in FIG. 12.

Component relationships during normal loaded conditions, i.e., when the head assembly and disc are operatively engaged, are shown in solid lines, and it can be seen in the figure that the spring force of the load point spring element 246 has been substantially overcome by the load force generated by the spring portion of the head suspension, as represented by arrow 254, and the cantilever portion 250 of the load point spring element 246 is thus in contact with the lower surface of the rigid beam portion 242. Therefore, during normal operation, the load force 254 generated by the head suspension spring portion is passed through the load point protrusion 244 carried on the load point spring element 246 to the contact surface 256 of the gimbal, which corresponds to either the central tongue 182 in the embodiment of FIG. 4 or the cantilevered portion 204 of the embodiment of FIG. 5, and from the gimbal to the microactuator to the head assembly, just as in the previously described embodiments.

During unloaded conditions, however, the spring force of the load point spring member 246 is large enough to overcome the spring characteristics of the gimbal elements, and the cantilever portion 250 of the load point spring member 246 moves to the position shown by dashed lines at 258 as the gimbal is displaced to the extent allowed by the limiting features, as shown in FIG. 10.

Since the plane of the gimbal contact surface during unloaded conditions, as shown at 260, is determined by the three-point contact between the gimbal elements and the limiting features, as previously described, the plane of the contact surface—and, therefore, the plane of the attached head assembly—can readily be optimized by controlling the relative positions of the limiting feature contacts.

Thus, during loading of the head assemblies onto the disc surfaces, the attitude of the head will be controlled by the load point spring element 246 forcing the contact elements of the gimbal into contact with the limiting features. As the actuator moves the head suspensions inward off the ramp structures, the lifting force (238 in FIG. 10) at the ramp contact feature 216 is removed, the load force of the spring portion of the head suspension overcomes the spring force of the load point spring element 246 and the operational relationship shown by solid lines in FIG. 12 is reestablished without the possibility of the head assemblies encountering the disc surfaces at an uncontrolled attitude.

In summary, the present invention provides a head suspension particularly useful in mounting a head/microactuator assembly. The head suspension includes a gimbal which transfers the load force of the head suspension to the head assembly via the microactuator, and thus allows free movement of the head assembly relative to the microactuator. The gimbal comprises gimbal beams having reverse bend portions at their distal ends to increase the compliance of the gimbal in the pitch axis of the head assembly. The gimbal also comprises a gimbal leading edge lifting feature near the center of its proximal end. The head suspension also includes a modified rigid beam portion that comprises a ramp contact feature at the extreme distal end of the rigid beam portion, and lift displacement limit features laterally disposed near the distal end of the rigid beam portion which extend proximally to a position beneath the reverse bend portions of the gimbal beams. The head suspension further includes a leading edge limit feature which extends beneath the gimbal leading edge lifting feature. During head unloading operations, the ramp contact feature interacts with a ramp structure to remove the head assembly from operational engagement with a disc, and displacement of the gimbal relative to the rigid beam portion is limited by contact between the lift displacement limit features of the rigid beam portion and the reverse bend portions of the gimbal, and by contact between the leading edge limit feature of the head suspension and the leading edge lifting feature of the gimbal. The same displacement limiting is operative in response to applied mechanical shocks which tend to lift the head assembly out of operational engagement with the disc. In another aspect of the invention, the rigid beam portion includes a load point spring element that mounts the load point protrusion of the head suspension, and biases the load point protrusion into engagement with the gimbal. During operational engagement of the head assembly with the disc, a load force generated by a spring portion of the head suspension acts to overcome the bias force of the load point spring element to allow operation of the gimbal. During head loading operations, when the head assembly is unsupported by an air bearing between the head assembly and the disc, the bias force of the load point spring element produces engagement of the displacement limiting features to optimize the attitude of the head assembly relative to the disc.

From the foregoing, it is apparent that the present invention is particularly well suited to provide the benefits set forth hereinabove as well as others inherent therein. While particular embodiments of the invention have been described herein, modifications to the embodiments that fall within the envisioned scope of the invention may suggest themselves to one of skill in the art who reads this disclosure. Therefore, the scope of the invention should be considered to be limited only by the following claims.

What is claimed is:

1. A head suspension, for mounting a head/microactuator assembly, comprising a head assembly and a microactuator assembly, in a disc drive, the head suspension comprising:

a beam including a rigid beam portion and a ramp contact feature adapted for loading and unloading the beam;

means for loading and unloading the head/microactuator assembly into and out of operational engagement with a disc; and a gimbal portion coupling the head/microactuator assembly to the beam, the gimbal portion providing compliance in a pitch axis of the head/microactuator assembly, the gimbal portion further comprising:
  first means for mounting the head/microactuator assembly to allow the head assembly to move freely in relationship to the microactuator assembly; and
  second means for increasing the compliance of the gimbal in the pitch axis.

2. A head suspension for mounting a head/microactuator assembly, comprising a head assembly and a microactuator assembly, in a disc drive that dynamically loads and unloads the head/microactuator assembly into and out of operational engagement with a disc, the head suspension comprising:
  a gimbal portion for providing compliance in a pitch axis of the head/microactuator assembly, the gimbal portion further comprising:
    first means for mounting the head/microactuator assembly to allow the head assembly to move freely in relationship to the microactuator assembly;
    second means for increasing the compliance of the gimbal in the pitch axis;
  a spring portion for generating a load force;
  a rigid beam portion for transferring the load force to the gimbal portion;
  first lift displacement limiting means integral with the gimbal portion; and
  second lift displacement limiting means integral with the rigid beam portion;
  the first and second lift displacement limiting means for limiting displacement of the gimbal portion relative to the rigid beam portion during dynamic unloading of the head/microactuator assembly out of operative engagement with the disc.

3. A head suspension as claimed in claim 2, further comprising:
  load point protrusion biasing means, integral with the rigid beam portion, for biasing the first and second lift displacement limiting means into engagement during dynamic loading of the head/microactuator assembly into operative engagement with the disc.

4. A head suspension, for mounting a head/microactuator assembly, comprising a head assembly and a microactuator assembly, in a disc drive, the head suspension comprising:
  a beam including a rigid beam portion and a ramp contact feature adapted for loading and unloading the beam;
  a ramp that dynamically loads and unloads the head/microactuator assembly; and
  a gimbal portion coupling the head/microactuator assembly to the beam, the gimbal portion comprising:
    mounting portions for attaching the gimbal portion to the head/microactuator assembly via the microactuator assembly to allow free movement of the head assembly relative to the microactuator assembly; and
    laterally disposed, longitudinally extending gimbal beams for providing compliance in a pitch axis of the head/microactuator assembly;
    the gimbal beams further comprising, at distal ends thereof, reverse bend portions for increasing the compliance of the gimbal beams in the pitch axis.

5. A head suspension, for mounting a head/microactuator assembly, comprising a head assembly and a microactuator assembly, in a disc drive that dynamically loads and unloads the head/microactuator assembly into and out of operational engagement with a disc, the head suspension comprising:
  a gimbal portion, comprising:
    mounting portions for attaching the gimbal portion to the head/microactuator assembly via the microactuator assembly to allow free movement of the head assembly relative to the microactuator assembly; and
    laterally disposed, longitudinally extending gimbal beams for providing compliance in a pitch axis of the head/microactuator assembly;
    the gimbal beams further comprising, at distal ends thereof, reverse bend portions for increasing the compliance of the gimbal beams in the pitch axis;
    a centrally disposed gimbal leading edge lifting feature; and;
  wherein the head suspension further comprises:
    a spring portion for generating a load force;
    a rigid beam portion for transferring the load force to the gimbal portion; the rigid beam portion further comprising lift displacement limiting features; and
    a leading edge limit feature which extends beneath the gimbal leading edge lifting feature;
    the reverse bend portions contacting the rigid beam lift displacement limiting features and the gimbal leading edge lifting feature contacting the leading edge limit feature during dynamic unloading of the head/microactuator assembly from operative engagement with the disc to limit displacement of the gimbal portion relative to the rigid beam portion.

6. A head suspension, as claimed in claim 5, wherein the rigid beam portion further comprises:
  a load point spring element mounting a load point protrusion;
    the load point spring element providing a biasing force for encouraging the load point protrusion into engagement with the gimbal portion; and
  wherein the biasing force of the load point spring element acts to cause contact between the reverse bend portions and the rigid beam lift displacement limiting features and contact between the gimbal leading edge lifting feature and the leading edge limit feature during dynamic loading of the head/microactuator assembly into operative engagement with the disc.

7. The head suspension of claim 5 wherein the head assembly is kept in a substantially parallel relationship with the disc during loading of the head assembly on the disc.

8. The head suspension of claim 5 wherein the rigid beam portion comprises a load point projection and the gimbal portion includes a load point that engages the load point projection.

9. The head suspension of claim 8 further comprising a load point spring element coupled between the load point projection and the rigid beam portion.

10. The head suspension of claim 8 wherein the gimbal portion includes a bridging element engaging the load point projection.

11. The head suspension of claim 5 wherein the microactuator includes standoffs and the head suspension further comprises a flex circuit that is soldered to the standoffs and bonded to the microactuator assembly with a bonding agent.

12. A head suspension, for mounting a head/microactuator assembly in a disc drive that dynamically loads and unloads the head/microactuator assembly into and out of operational engagement with a disc, the head suspension comprising:

a gimbal portion, comprising:
   laterally disposed, longitudinally extending gimbal beams for providing compliance in a pitch axis of the head/microactuator assembly;
      the gimbal beams further comprising, at distal ends thereof, reverse bend portions for increasing the compliance of the gimbal beams in the pitch axis; and
   a centrally disposed gimbal leading edge lifting feature;
a spring portion for generating a load force;
a rigid beam portion for transferring the load force to the gimbal portion;
   the rigid beam portion further comprising:
      lift displacement limiting features; and
      a load point spring element mounting a load point protrusion;
         the load point spring element providing a biasing force for encouraging the load point protrusion into engagement with the gimbal portion;
the reverse bend portions contacting the rigid beam lift displacement limiting features and the gimbal leading edge lifting feature contacting the leading edge limit feature during dynamic unloading of the head/microactuator assembly from operative engagement with the disc to limit displacement of the gimbal portion relative to the rigid beam portion; and
wherein the biasing force of the load point spring element acts to cause contact between the reverse bend portions and the rigid beam lift displacement limiting features and contact between the gimbal leading edge lifting feature and the leading edge limit feature during dynamic loading of the head/microactuator assembly into operative engagement with the disc.

13. A head suspension, for mounting a head/microactuator assembly, comprising a head assembly and a microactuator assembly, in a disc drive, the head suspension comprising:
   a ramp that dynamically loads and unloads the head/microactuator assembly; and
   a gimbal portion, comprising:
      mounting portions for attaching the gimbal portion to the head/microactuator assembly via the microactuator assembly to allow free movement of the head assembly relative to the microactuator assembly;
      laterally disposed, longitudinally extending gimbal beams for providing compliance in a pitch axis of the head/microactuator assembly;
      the gimbal beams further comprising, at distal ends thereof, reverse bend portions for increasing the compliance of the gimbal beams in the pitch axis; and wherein the microactuator assembly comprises a microactuator motor, and the head suspension further comprising a flex circuit carrying electrical control signals to the microactuator motor.

14. The head suspension of claim 13 wherein the circuit is connected to the microactuator assembly through soldered connections.

15. The head suspension of claim 13 wherein the flex circuit is bonded to the microactuator assembly with a bonding agent.

16. The head suspension of claim 15 wherein the bonding agent comprises epoxy.

17. A head suspension, for mounting a head/microactuator assembly, comprising a head assembly and a microactuator assembly in a disc drive, the head suspension comprising:
   a ramp that dynamically loads and unloads the head/microactuator assembly; and
   a gimbal portion, comprising:
      mounting portions for attaching the gimbal portion to the head/microactuator assembly via the microactuator assembly to allow free movement of the head assembly relative to the microactuator assembly;
      laterally disposed, longitudinally extending gimbal beams for providing compliance in a pitch axis of the head/microactuator assembly;
      the gimbal beams further comprising, at distal ends thereof, reverse bend portions for increasing the compliance of the gimbal beams in the pitch axis;
   a flex circuit connected to the microactuator assembly, the microactuator assembly including standoffs and the flex circuit including connecting arms that are soldered to the standoffs.

18. The head suspension of claim 17 wherein the flex circuit includes a bridging portion that is spaced apart from the head assembly and that extends between the standoffs.

19. The head suspension of claim 18 wherein the gimbal portion includes a bridging element overlying the bridging portion.

20. The head suspension of claim 19 wherein the gimbal portion includes double bend portions joining the bridging element to the reverse bend portions.

21. The head suspension of claim 19 wherein the bridging element includes a load point.

* * * * *

UNITED STATES PATENT AND TRADEMARK OFFICE
CERTIFICATE OF CORRECTION

PATENT NO.    : 6,549,375 B1
DATED         : April 15, 2003
INVENTOR(S)   : Crane et al.

It is certified that error appears in the above-identified patent and that said Letters Patent is hereby corrected as shown below:

Column 18,
Line 5, after "wherein the" insert -- flex --.

Signed and Sealed this

Twenty-first Day of October, 2003

JAMES E. ROGAN
*Director of the United States Patent and Trademark Office*